UNITED STATES PATENT OFFICE.

ALBERT F. FRENCH, OF DETROIT, MICHIGAN.

FILLER COMPOSITION.

1,352,741.　　　　　Specification of Letters Patent.　　Patented Sept. 14, 1920.

No Drawing.　　Application filed December 16, 1918.　Serial No. 266,932.

*To all whom it may concern:*

Be it known that I, ALBERT F. FRENCH, a citizen of the United States of America, residing at Detroit, in the county of Wayne and State of Michigan, have invented certain new and useful Improvements in Filler Composition, of which the following is a specification.

The object of my invention is to provide a filler composition that may be advantageously used for filling cracks, scratches and the scarred surfaces of highly finished bodies, for instance, the walls of an automobile body, the filler when properly colored rendering the scratch or scar invisible and as though nothing had happened to the finished surface.

My composition consists of celluloid, alcohol, ether, shellac, gum or rosin mixed to provide a liquid compound that may be applied similar to varnish or paint.

The celluloid which I use is preferably scrap celluloid, such as may be conveniently obtained at factories where automobile curtains are made with celluloid panels or inserts. Such scrap celluloid is generally in small thin pieces that may be readily dissolved or softened by ether or alcohol, both of which are of a commercial form.

The shellac is also a commercial product and the gum or rosin is well known, the gum thus being virgin sap from the gum trees.

In preparing one gallon of the composition, I prefer to use the ingredients in about the following proportion, viz.; eight ounces of celluloid, twenty ounces of alcohol, four ounces of shellac, two ounces of ether, and two ounces of gum or rosin.

The above ingredients are prepared in three batches or lots. First, to eight ounces of scrap celluloid is added eight ounces of wood alcohol, the alcohol softening the celluloid to the consistence of jelly. To this semi-liquid celluloid is added two ounces of ether which cuts the celluloid and reduces it to liquid form. The second batch or lot consists of four ounces of shellac to which is added eight ounces of alcohol to cut and reduce the shellac. The third batch consists of two ounces of rosin or gum thus to which is added four ounces of alcohol, which cuts and reduces the rosin or gum. These three batches are thoroughly mixed together and produce a syrup like composition to which may be added more alcohol, according to the consistency of the filler desired; the proportion herein stated being for one gallon of the filler as it will be generally used.

In this composition the celluloid is a very important ingredient as it will not shrink to any perceptible degree and consequently forms a body in the filler that permits of the filler completely closing a crack or scratch. When ordinary varnish or other fillers are applied to cracks and permitted to dry, the varnish or filler will contract and thus indicate where the crack or scratch has occurred, but this is not true with my filler as the celluloid is non-shrinkable and when placed in the crack will completely fill the same and remain in its normal condition.

The ether entering into the composition not only serves to reduce and thin out other ingredients, but it possesses great penetrating power. It is the present practice when eliminating scratches and scars to scrape or burn paint off of the same, so that a new application of paint or varnish will take an immediate hold. The ether in my composition obviates the necessity of burning or scraping away an old finish, as the ether will penetrate the old paint and in so doing anchor or lodge the celluloid or gum to such an extent that the crack or scratch is completely filled and since there is no shrinkage of the filler, it is impossible to detect the location of the crack or scratch after the surface is finished.

The rosin entering into the composition serves as a hardener and also contributes to the body of the filler. On some jobs rosin can be readily used but on the finer jobs the gum thus, which is finer and clearer than rosin will be used.

The composition immediately dries and permits of paint or varnish being used to finish off a piece of work, and it is optional with the user of the filler as to the consistency of the same. On some pieces of work it may be preferable to use a large quantity of alcohol in order to thin out the composition, while on other pieces of work the percentage of alcohol may be reduced so that the filler is thick and syrup like in its consistency.

In making the three batches independent of each other the celluloid, shellac and gum can be reduced to a desired liquid state and then by combining the three batches a filler composition is obtained which may be applied with a brush as the shellac lends a varnished appearance to the product, but is not used to such an extent as to impair the usefulness of celluloid as a non-shrinkable filler ingredient. To the composition may be added any suitable coloring matter or after a crack or scratch is filled it may be painted over with paint or colored varnish corresponding to the main finish of the piece of work.

What I claim is:—

1. A filler composition comprising as essential ingredients celluloid, shellac, rosin, alcohol, and ether.

2. A composition for a filler solution, consisting of celluloid eight ounces, shellac four ounces, rosin two ounces, ether two ounces, and alcohol twenty ounces.

In testimony whereof I affix my signature in the presence of two witnesses.

ALBERT F. FRENCH.

Witnesses:
KARL H. BUTLER,
ANNA M. DORR.